Figure 1:
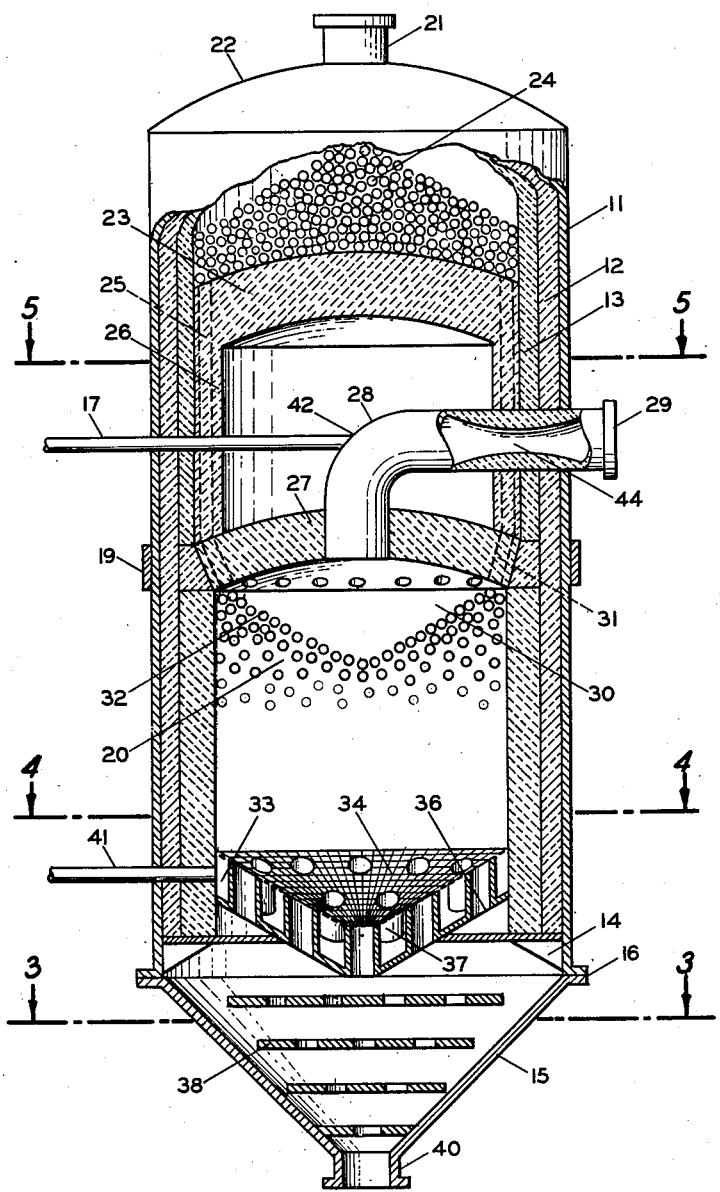

Dec. 30, 1952 S. P. ROBINSON 2,623,842
HYDROCARBON CONVERSION PROCESS AND REACTION
CHAMBER FOR PEBBLE HEATER APPARATUS
Filed Jan. 5, 1948 3 Sheets-Sheet 1

INVENTOR.
SAM P. ROBINSON

BY Hudson and Young

ATTORNEYS

INVENTOR.
SAM P. ROBINSON
BY Hudson and Young
ATTORNEYS

Dec. 30, 1952 S. P. ROBINSON 2,623,842
HYDROCARBON CONVERSION PROCESS AND REACTION
CHAMBER FOR PEBBLE HEATER APPARATUS
Filed Jan. 5, 1948 3 Sheets-Sheet 3

*INVENTOR.*
SAM P. ROBINSON
BY *Hudson and Young*

ATTORNEYS

Patented Dec. 30, 1952

2,623,842

UNITED STATES PATENT OFFICE 2,623,842

HYDROCARBON CONVERSION PROCESS AND REACTION CHAMBER FOR PEBBLE HEATER APPARATUS

Sam P. Robinson, Bartlesville, Okla., assignor to Phillips Petroleum Company, a corporation of Delaware Application January 5, 1948, Serial No. 576

12 Claims. (Cl. 196—52)

This invention relates to a process and an apparatus for effecting contact between fluids and solid particulate contact material. In one aspect this invention relates to an improved process for converting gases. In another aspect this invention relates to an apparatus for effecting contact of gas with a downwardly flowing contiguous mass of pebbles. In still another aspect this invention relates to a means for providing an evenly distributed flow of gas upwardly through a downwardly flowing contiguous mass of pebbles.

Utilization of a moving contact mass in a process for contacting fluids with solids is applicable to and advantageous in various processes such as hydrocarbon conversion, gas absorption treatment, and gas-solid heat exchange. Apparatus referred to herein for conducting such processes in the presence of a moving contiguous mass of pebbles is commonly called pebble heating apparatus.

A principal use of pebble heating apparatus is in the conversion of hydrocarbons, involving thermal or catalytic processes such as cracking, hydrogenation, dehydrogenation, isomerization, polymerization and the like.

The term "pebble" as used herein refers to the small pebble-like solid particulate refractory elements comprising the contact mass most generally used in pebble heating apparatus. Pebbles so used are preferably substantially spherical and relatively uniform in size, but in some instances they may be rod shaped or irregular in size. Spheres of about ⅛" to 1" in diameter function desirably, and those of about ¼" to ½" are most practical. Pebbles as used herein comprise any solid refractory material of flowable form, size, and strength suitable for carrying heat for transfer to gases in contact therewith. Pebbles comprising beryllia, alumina, zirconia, mullite, and periclase, for example, make excellent contact material for most processes. Metal balls such as nickel, Monel, inconel, iron, etc. have utility in specific processes. Pebbles and/or pebble surfaces may be catalytically active, or inert, to gases in contact therewith, depending on the specific process. For example, in non-catalytic cracking of a gas the requisite is heat transfer and an inert contact mass having a high heat carrying capacity for transfer of heat to the gas in contact therewith is preferable. On the other hand, a catalytic gas conversion reaction would require the presence of a catalyst, in which case at least the pebble surface area would comprise the specific catalytic material needed.

The conventional pebble heater apparatus usually comprises a series of two chambers positioned substantially in vertical alignment one with the other. The top and bottom chambers are commonly referred to, respectively, as the pebble heating chamber and the gas contacting or, more preferably herein, the gas reaction chamber. Hot gases are introduced to the pebble heating chamber and are passed upwardly therethrough in contact with a downwardly flowing contiguous mass of pebbles. Hot gases, so utilized, usually comprise combustion or flue gases produced from substantially complete combustion of combustible gases in a combustion chamber adjacent the mass of pebbles in the pebble heating chamber or in some cases, in a chamber external to the apparatus. However, hot gases from other sources are, in many instances, suitable for transferring heat to pebbles in a pebble heating chamber. Hot gases in contact with the pebble mass in the pebble heating chamber transfer heat to the pebble mass in a first heat transfer step. Effluent gases from the pebble heating chamber having transferred heat to the pebble mass are relatively cool and are passed to the stack through an upper portion of the heating chamber. Pebbles thus heated in a first heat transfer step are passed downwardly from the pebble heating chamber through a conduit commonly called the pebble throat, to the reaction chamber and are contacted therein in countercurrent flow with upwardly flowing feed gases in a second heat transfer step. Effluent gas from the reaction chamber is passed from the upper portion thereof. Pebbles subsequent to transferring heat to the feed in the gas reaction chamber are relatively cool and are passed from the lower portion of the gas reaction chamber to an external point from which they are elevated to the inlet of the pebble heating chamber for recycle. In some instances the pebbles require periodic regeneration which may be conducted in a step intermediate the exit flow of pebbles from the reaction chamber and their recycle. Preferably, however, since the function of the regeneration step is usually to remove carbonaceous matter from the pebble surface, the regeneration is more often conducted in the pebble heating chamber during pebble recycle, in the presence of air introduced to the pebble heating chamber along with the hot gases.

In pebble heating apparatus of one conventional design, the pebble throat is positioned axially in the top closure member of the gas reaction chamber and extends therethrough a substantial but short distance. When pebbles enter the reaction chamber through such a positioned throat, the pebble mass thus accumulated takes a natural repose causing the upper surface of the mass, or pebble bed, to take the general form of a cone with the apex in the pebble throat. The bottom closure member of the gas reaction chamber in the conventionally designed pebble heater apparatus is usually in the form of an inverted cone to aid the exit flow of pebbles therefrom. The bottom surface of the pebble bed, defined by the contour of the conical closure member, takes the general form of an inverted cone. The pebble bed therefore usually takes the general form of a modified cylinder having a conical top and a funnel-shaped bottom. In such a pebble mass, the vertical path of the upwardly flowing feed gas is longest along the axis and shortest along the periphery and varies proportionately intermediate the two.

Since the feed gas is disposed to travel the path of least resistance the gas flow rate is disproportionately high along the periphery of the down-flowing contact mass. Feed gases flowing upwardly through the peripheral portion of the pebble bed are thus in contact with the pebble mass for a shorter duration than are those flowing upwardly along the axial or central portions. Feed gases flowing upwardly along vertical paths intermediate the peripheral and central vertical portions of the pebble mass have a time of contact varying between the two extremes.

In a conventional gas reaction chamber, the downward cross sectional flow of pebbles within portions of the pebble mass approaching the funnel-shaped closure member decrease in a direction toward the periphery. Such an occurrence of varying downward flow of pebbles in the pebble mass is manifest in the relatively stagnant flowing portions of the pebble mass adjacent the pebble outlet means (positioned in the apex of the conical closure member) and extending upward into the pebble mass within the limits of an angle commonly referred to as the angle of slip which is usually in the range of 60–70° with the horizontal, which has its vertex at the inlet to the pebble outlet means. Such retarded pebble flow results not only from friction between pebbles but also from friction between the pebble bed and the walls of the funnel-shaped closure member. The head of pebbles above the angle is sufficient to overcome pebble friction as above described and hence the mass above the angle is capable of flow. The plane along the imaginary upper side of the angle represents a line of cleavage along which slipping occurs, i. e., within the angle, pebble friction is sufficient to form the relatively stagnant flowing portion and above the angle the pebble friction is overcome. Because of such a line of slippage, the angle so described is commonly referred to as the angle of slip.

Although pebbles in such relatively stagnant zones transfer heat to feed gases in contact therewith, they become ineffective in that regard, although still in the gas reaction chamber, by virtue of their nearly permanent residence therein. Consequently, feed gases in contact with those cooled pebbles are insufficiently treated. Zones of relatively stagnant flow effectively lower the overall efficiency of the entire heat transfer step in the gas reaction chamber.

A further undesirable effect in regard to inefficiency of the heat transfer step in the conventional gas reaction chamber is the variance within the pebble mass of contact time between pebbles and feed gases as discussed above, i. e., as regards the general shape of the pebble mass in the conventional gas reaction chamber and the flow therethrough of feed gases along the path of least resistance. In such a case, upwardly flowing feed gases, in a disproportionately large amount, follow paths along the outer portions of the pebble mass which are shorter and are cooled most rapidly with the net result that a significant proportion of feed gases are contacted with pebbles already cooled to below the requisite minimum conversion temperature.

By virtue of both the presence of zones of relatively stagnant pebble flow and of the variance of contact time between pebbles and feed gases within the conventional reaction chamber, significant volumes of gas are insufficiently treated. For example, if the temperature of pebbles entering the gas reaction chamber is maintained to effect proper heat transfer in the peripheral portions of the pebble mass, the central portion thereof is excessively hot and causes overheating or over-reaction of the gases. The converse is also true, i. e., if the pebble inlet temperature is maintained to effect proper heat transfer in the central zone of the pebble mass, the disproportionately large amount of feed gas flowing upwardly along the outer zones of the pebble mass is under-heated or under-reacted.

Such nonuniform conversion conditions of temperature and contact time in the gas reaction chamber of a pebble heating apparatus cause over-reacting or under-reacting. Uneconomic operation results from over-reacting and under-reacting since in each case relatively low yields of the desired product are obtained. For example, when cracking hydrocarbon gases, lower conversion is concomitant with under-reacting and relatively low yields of desired product are obtained; and when over-reacting is effected, high conversion is concomitant with excessive formation of undesirable heavy materials and tarry product at the expense of a greatly reduced normal yield of desired product.

It is highly desirable, therefore, that uniform conversion conditions of contact time and temperature be maintained in a gas reaction chamber of a pebble heating apparatus between feed gases and the pebble contact mass.

It is an object of this invention to provide an improved gas reaction chamber in a pebble heating apparatus.

It is another object to provide an apparatus for contacting gases and solids in countercurrently moving stream relations which permit substantially uniform contact time through the bed of solids.

Another object is to provide apparatus for contacting gases with pebbles which assumes substantially an even distribution of gases through the mass of pebbles.

Still another object of this invention is to provide a method for converting a gas in countercurrent flow with a contiguous mass of pebbles which allows substantially uniform conversion conditions of contact time and temperature between the pebbles and the gas throughout the mass.

Other objects of this invention will become apparent from the accompanying discussion and disclosure.

In accordance with this invention a gas reaction chamber in a pebble heater apparatus is provided with a gas distribution member positioned coaxially within the lower portion thereof. The gas distribution member provides for an evenly distributed flow of feed gas upwardly through the pebbel bed and for an evenly distributed flow of pebbles downwardly through the reaction chamber. A plurality of perforate plates parallel to the horizontal are located in spaced-apart relation sub-adjacent to the gas distribution member, usually in the bottom closure member of the chamber. Preferably, a plurality of concentric rings on a cross support is substituted for such a plate. A means is provided for passing hot pebbles to the gas reaction chamber through a plurality of conduits positioned substantially about the periphery thereof. This is provided for by an arrangement of a series of domes coaxially positioned within an enclosed cylinder positioned in vertical superposed relation to the reaction chamber and comprising the top closure thereof. The hot pebble inlet positioned in the top member of the enclosed cylinder provides for a flow of hot pebbles into a surge chamber above a first dome, from the periphery of which the pebbles flow vertically downward to the periphery of a second dome and therethrough to the reaction chamber. A gas outlet means is located axially in this second dome, which forms the upper closure of the reaction chamber, so as to provide for rapid removal of effluent gases from the gas collecting space which comprises a small conical area, unoccupied by pebbles in the top of the chamber. An optional ejector means comprising a Venturi tube and a water fog nozzle is positioned in communication with the gas outlet to provide for additional rapid removal and for a rapid quench of the effluent gases from the reaction chamber.

In another embodiment of this invention a gas distribution member is located at such a distance above the pebble outlet opening that it is above the point of intersection of the angle of slip and the chamber wall. Above this point of intersection, uniformly vertical downward flow of pebbles throughout the pebble bed is inherent. In this case means such as the plurality of perforate plates near the bottom closure member for directing exit flow of pebbles from the chamber is unnecessary since the entire portion of the pebble bed which is contacted with flowing gases is in the zone of uniform flow above the angle of slip.

Figure 2:
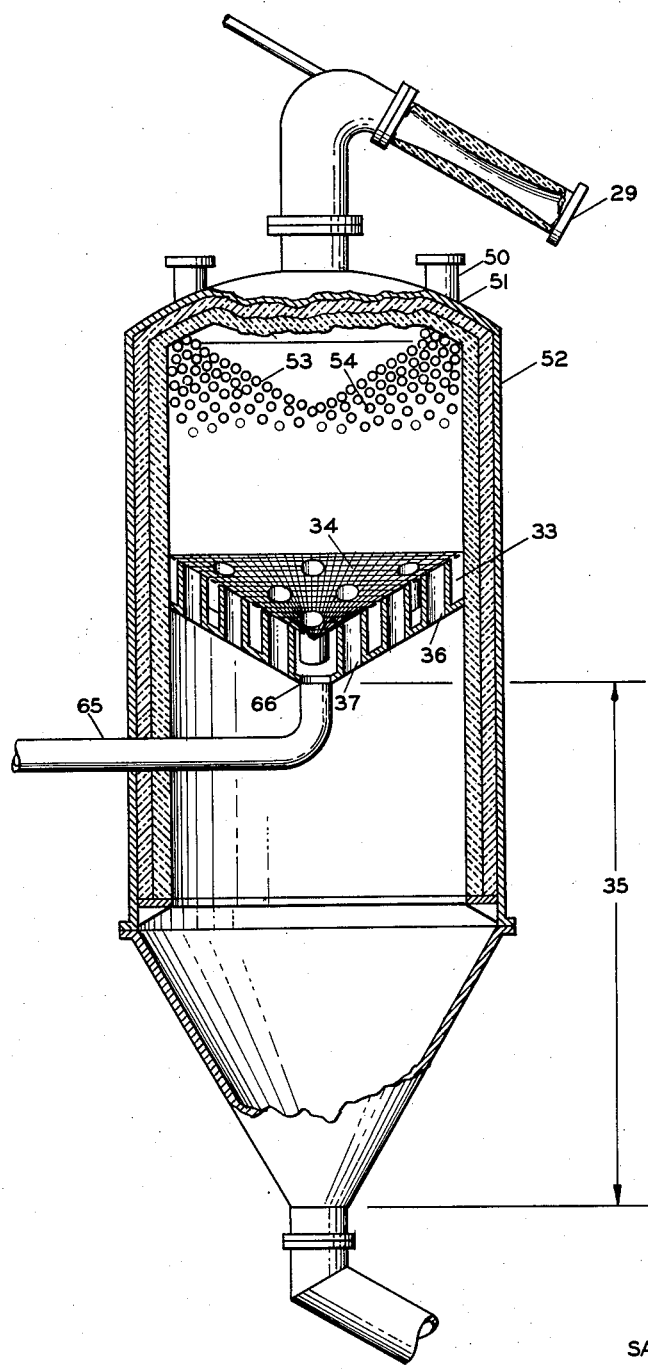
Figure 3:
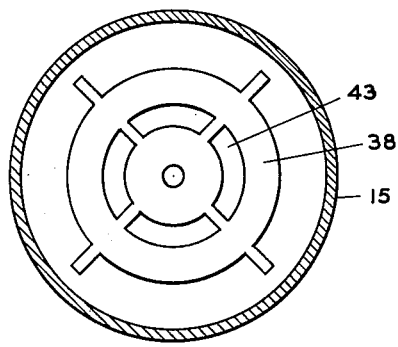
Figure 4:
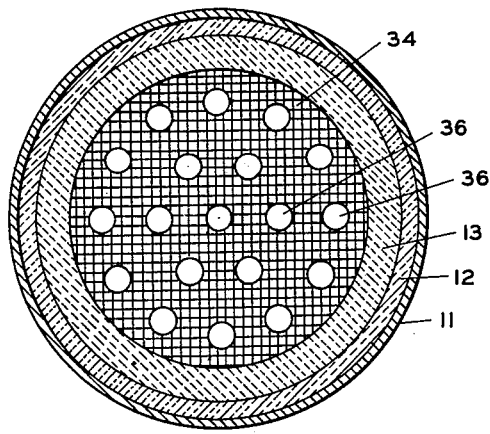
Figure 5:
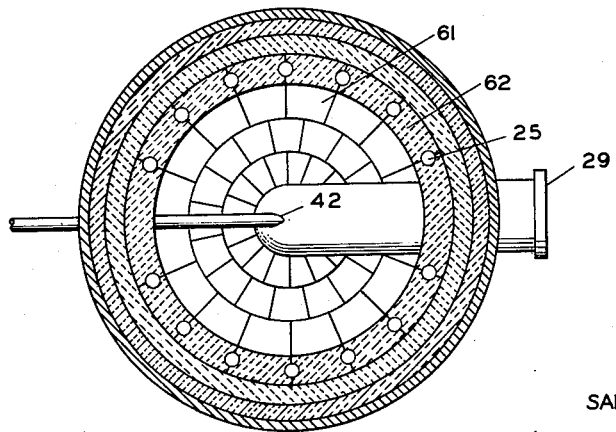

To understand more fully the nature of the invention, reference may be had to the attached drawings which diagrammatically illustrate the invention. Figure 1 is an elevation in section of the preferred apparatus. Figure 2 is a diagrammatic showing of another embodiment of the invention which provides for the vertical downward flow of pebbles through the gas distribution member in the absence of the subjacently positioned perforate plates or concentric rings as shown in Figure 1. Figure 3 is a sectional cut on line 3—3 in Figure 1 showing a preferred arrangement of the concentric rings positioned in the bottom conical closure member of Figure 1. Figure 4 is a sectional cut 4—4 in Figure 1 showing the gas distribution member in detail. Figure 5 is a sectional cut 5—5 in Fig. 1 showing the dome which forms the upper closure of the reaction chamber and the position therein of the effluent gas outlet conduit and the optional ejector means. The specific ejector means shown is not essential to the practice of this invention, but it does aid the rapid removal and quench of the effluent gases from the reaction chamber.

Referring to Figure 1, 11 is the outer shell of a vertically extending reaction chamber lined with insulating material 12 and high temperature refractory material 13. The refractories are shown supported on a shelf 14 fixed to shell 11. Bottom closure member 15 is separable from shell 11 at 16, and the two are bolted together. The top closure member of reaction chamber 20 comprises a closed cylinder in vertical superposed relation thereto. Pebble inlet conduit 21 is axially positioned in the top closure member 22 of shell 11 and extends therethrough to permit the flow of hot pebbles onto dome 23, whose upper side is convex and aids thereby the flow of pebbles to its periphery. Dome 23 is positioned in spaced-apart relation to inlet 21 to provide a surge volume 24 in the flow of pebbles from inlet 21 to the periphery of dome 23. Vertical pebble conduits or passageways 25 are positioned about the axis of dome 23 and substantially adjacent to and preferably on the periphery of dome 23. Dome 27 is positioned below and coaxial with dome 23. The bottom surface of dome 27 serves as the top interior surface of reaction chamber 20. Effluent gas outlet 28 provides for the flow of effluent gas from chamber 20 and is axially located in dome 27. An ejector means 29 comprising a Venturi type tube and a water fog nozzle is positioned intermediate domes 23 and 27 and communicates with gas outlet conduit 28 to effect rapid removal and quenching of effluent gases from the small gas collecting space 30 in the top of chamber 20. Ejector means 29 can be replaced with conventional conduit, if desired. The flow of pebbles into chamber 20 from pasageways 25 is conducted through passageways 31 positioned in dome 27 and connected with the passageways 25. Passageways 31 slope preferably downwardly and inwardly to chamber 20. Domes 23 and 27 each close shell 11 adjacent the insulation means 12 and 13 and are located coaxially within shell 11. The flow of pebbles into chamber 20 from conduits 31 causes formation of a pebble bed having an upper surface 32 which is depressed in the center to form an inverted cone. Gas distribution member 33 further illustrated in Figure 4 is preferably a hollow steel member closing shell 11 and positioned in the lower portion thereof subjacent to the pebble bed in chamber 20. Member 33 has a perforate upper conical surface 34 having the same general configuration as the upper surface 32 of the pebble bed. Perforate surface 34 may be a perforate plate or a metal screen, preferably an alloy steel screen with a mesh small enough to prevent the pebbles falling therethrough. Member 33 has a closed bottom surface 36, and contains vertically channeled passageways 37 therethrough to permit the exit flow of pebbles from reaction chamber 20. Perforate plates 38 in the conical bottom closure member 15 are parallel to the horizontal and are positioned in spaced-apart relation to insure vertical downward flow of pebbles through the pebble bed through member 33. The perforate area or slots in each plate are out of alignment with those of each plate above and below, preferably as shown, in Figure 1. Conduit 40 provides for delivery of exit flowing pebbles from chamber 20 to an elevating means (not shown) for returning the pebbles to a pebble heater upstream from conduit 21 for recycle or to a regeneration treatment intermediate conduits 40 and the pebble heater. Feed gas inlet 41 through shell 11 is positioned to permit gas flow to member 33 preferably through the side thereof. A plurality of inlets 41 may be utilized, if desired.

In another modification of my invention as shown in Figure 2, pebble inlet conduits 50 are located in the top member 51 of shell 52 substantially adjacent the periphery thereof, and permit the flow of hot pebbles directly into reaction chamber 54 to form therein a pebble bed having the upper surface 53 in the form of an inverted cone. Gas distribution member 33 is located at a vertical distance 35 above pebble outlet 40 of preferably at least 1½ times the diameter of reaction chamber 54. As in Fig. 1, the use of ejector means 29 in communication with the gas outlet means is optional. Gas inlet means 65 through shell 52 is positioned to permit gas flow upwardly into member 33, preferably at the axis as shown at 66. This gas inlet 65 may also be connected laterally to member 33 similar to Fig. 1.

Member 33, serving as a gas distribution member and also as a support for the mass of solid heat exchange material in the gas reaction chamber has its bottom surface 36 preferably parallel to its upper surface 34 as shown in Figures 1 and 2. However, if desired, the bottom surface thereof may be horizontal.

Figure 5 shows in detail the construction of dome 27 which is also representative of that of dome 23. However, various modifications of the construction and design of the domes, not herein described, can be made and still remain within the scope and spirit of this invention. The domes are constructed preferably from refractory bricks each in the form of a plug tapering in on all four lateral sides from top to bottom and having a convex upper surface. These bricks are constructed preferably of super refractory material and are combined together to form self-sustaining rings 61 as shown in Fig. 5. Rings 61 also give support to one another to form a load supporting dome. The bottom surface of each load supporting dome is preferably concentric with the upper surface thereof. Conduits 25 and 31 are preferably formed by virtue of refractory bricks 62 in wall 26 and the peripheral bricks 61 in domes 23 and 27 having grooved sides so that when fitted with adjacent bricks the grooves form uninterrupted communications between surge chamber 24 and reaction chamber 20. Refractory wall 26 serves to house conduits 25 and to support dome 23 and in turn is supported by dome 27 resting on skew block 19. Conduits 25 may be of any desired cross-sectional shape.

The ejector means 29 in communication with the gas outlet means 28 comprises a Venturi tube 44 and a water fog nozzle 42. In addition to providing for a more rapid removal of effluent gas from the reaction chamber, the ejector means provides for a rapid quench therefore. In pebble heater designs previously used the pressure differential between the vapor space in the top of the gas heater and the quench tank has been utilized to cause flow of vapors between these two points. Use of the ejector in the gas outlet conduit reduces the final pressure of the products above the pebble level and in this manner increases yields and lowers the feed pressure required and compression cost of the feed. Upon passing a high velocity jet of water, steam or other inert fluid through the Venturi tube, a rapid ejection or aspiration of gas from the reactor is accomplished. When water is used it will cool the gases faster if the surface is increased by atomization. Commercial water fog atomizing nozzles produce finely atomized and high velocity water particles and can be used to advantage for aspirating the vapors.

In the apparatus of this invention, hot pebbles are passed to the reaction chamber to form a pebble bed having an upper surface taking the general form of an inverted cone. The resulting space which is unoccupied by pebbles is small and provides an efficient collecting space for effluent gas. The effluent outlet means positioned axially with the gas collecting space and adjacent thereto provides for rapid removal of effluent gases from the chamber. The use of the ejector means is preferable but optional. Rapid removal of effluent gases from the reaction chamber is of major importance in view of over-reacting being concomitant with excessive time of retention in the reaction chamber.

The gas distribution member serves to support a major portion of the pebble bed in the reaction chamber and has an upper conical surface similar to the upper surface of the pebble bed. In such an arrangement all vertical distances through the pebble bed are identical and there is no alternate path of lower resistance for the upwardly flowing feed gases to take. The perforate upper surface of the gas distribution member provides for the uniform introduction of feed gases to the pebble bed across its entire cross section. The utilization of the gas distribution member is of major importance since an evenly distributed upward flow of feed gases through the entire pebble bed is effected, which provides for a uniform time of contact of the feed gas with the pebble mass.

The relatively stagnant zones of the moving pebble mass formed in the conventional gas reaction chamber as described hereinbefore, are eliminated by the utilization of the gas distribution member 33, and the perforate means 38 as shown in Figure 1. By virtue of the vertically channeled passageways 37 and opening 43 vertical downward flow of the moving pebble mass in chamber 20 is provided. Pebbles in a potentially stagnant zone in chamber 20 move, thereby, at a rate substantially equal to that of the main body of the pebble bed. Perforate means 38 has a total "slotted" area, preferably equal to at least the cross sectional area of pebble outlet conduit 40. However, the cross sectional area of the slots can be varied to equal any desired total cross sectional area. In any case, the slotted openings are preferably uniform in size.

As will be evident to those skilled in the art, various modifications can be followed, in the light of the foregoing disclosure and discussion, without departing from the spirit or scope of the disclosure or from the scope of the claims.

I claim:

1. In an apparatus for effecting contact of a fluid with a downwardly flowing contiguous mass of solid aggregate material comprising a cylindrical reaction chamber vertically disposed and closed at either end and having positioned in the upper portion thereof solid aggregate inlet means to permit passage of same to form a bed thereof in said chamber and an effluent fluid outlet means, and in the lower portion thereof a fluid inlet means and a means for conducting flow of said solid aggregate from said chamber, the improvement comprising an enclosed vertically extending cylinder as a top closure member of said chamber in superposed relation thereto, a pebble inlet conduit located axially in the top of said enclosed cylinder to permit a flow of pebbles therethrough, a first dome located coaxially in said enclosed cylinder in spaced-apart relation to said pebble inlet to provide a surge in the flow of pebbles from said pebble inlet to the periphery of said first dome, the upper surface of said first dome being convex to aid said flow of pebbles, a second dome in said enclosed cylinder coaxially located downward from said first dome and contoured similarly to said first dome, said first dome and said second dome each closing said enclosed cylinder, the bottom exterior surface of said second dome also comprising the top interior surface of said reaction chamber, a plurality of vertical pebble conduits in said first dome and disposed substantially adjacent the periphery thereof and extending vertically downward to said second dome, a plurality of pebble conduits substantially adjacent the periphery of said second dome vertically below those of said first dome and communicating with said plurality of vertical pebble conduits to conduct pebbles therefrom downwardly and inwardly to said reaction chamber, and a product gas outlet conduit axially disposed in said second dome.

2. An apparatus for effecting contact of a gas with a down-flowing contiguous mass of pebbles, comprising a vertical cylindrical reaction chamber, a top closure member, and an inverted conical bottom closure member; a pebble mass support member within the lower portion of said chamber spaced from said bottom closure member and transversely closing said chamber, and having a perforate inverted conical upper surface corresponding in contour to the upper surface of a pebble mass as hereafter recited and an imperforate lower surface positioned from said upper surface to form a hollow space; at least one gas conduit inlet positioned in the lower portion of said chamber in communication with said hollow space, whereby gas admitted into said chamber is distributed upwardly through said inverted conical perforate surface of said support member; vertical pebble passageways through said pebble support member; vertically extending pebble conduit inlets in said top closure member disposed on an outer periphery thereof, whereby pebbles admitted into said chamber pass downwardly and inwardly therein to form a pebble mass having an indented upper surface; an effluent gas outlet conduit disposed axially in said top closure member; and pebble outlet means in the lower portion of said conical bottom closure member.

3. An apparatus for effecting contact of a gas with a down-flowing contiguous mass of pebbles, comprising a vertical cylindrical reaction chamber; a top closure member and a bottom closure member therefor; said bottom closure member transversely closing said reaction chamber and comprising a hollow pebble mass support member having a perforate inverted conical upper surface and an imperforate lower surface positioned from said upper surface to form a hollow space; at least one gas inlet conduit positioned in communication with said hollow space, whereby gas admitted into said chamber is distributed upwardly through the perforate upper surface of said bottom closure member; vertical pebble passageways through said bottom closure member for conducting an exit flow of pebbles from said reaction chamber; an inverted conical pebble-receiving member coaxially and subjacently positioned beneath said bottom closure member and rigidly attached thereto; a pebble outlet conduit axially positioned in the apex of said inverted conical pebble-receiving member; a plurality of horizontal slotted plates positioned in vertically spaced relation in said inverted conical member, each said plate closing a major portion of said conical member and the slots of the topmost plate being out of alignment with said pebble passageways and each plate having slots out of vertical alignment with the slots of a plate adjacent thereto, whereby the slotted areas of said plates provide for uniform withdrawal of pebbles from said passageway; said top closure member comprising an enclosed vertically extending cylinder in superposed relation to said reaction chamber; a pebble inlet conduit located axially in the top of said enclosed cylinder to permit a flow of pebbles therethrough; a first dome having a convex upper surface located coaxially within said closed cylinder in spaced apart relation to said pebble inlet to provide a surge in the flow of pebbles from said pebble inlet to said first dome, a second dome in said enclosed cylinder coaxially located downwardly from said first dome, said first dome and said second dome each closing said enclosed cylinder and said second dome forming the bottom closure member of said enclosed cylinder, the bottom exterior surface of said second dome being concave and comprising the top interior surface of said reaction chamber; a plurality of substantially vertically extending pebble conduits disposed substantially adjacent the periphery of said first dome and extending downwardly to said second dome, a plurality of pebble conduits substantially adjacent the periphery of said second dome communicating with said plurality of pebble conduits extending downwardly from said first dome to conduct pebbles into said reaction chamber, whereby pebbles admitted into said chamber form a pebble mass therein having a conically indented upper surface corresponding in contour to the upper perforate surface of said bottom closure member and to provide a gas collecting space above the apex of said conically indented upper surface; and a product gas outlet conduit disposed in said second dome in communication with said gas collecting space.

4. In a pebble heating apparatus utilizing a moving bed of heated pebbles, an improved gas reaction chamber comprising a substantially vertically disposed cylinder having a top closure member and having an inverted conical bottom closure member; a hollow pebble mass support member within a lower portion of said cylinder transversely closing said cylinder and positioned in spaced apart relation to the terminating point in the bottom closure member thereof a distance not less than 1½ times the diameter of said cylinder, and having a perforate inverted conical upper surface and a spaced apart imperforate lower surface to form a hollow space; at least one gas conduit inlet in the lower portion of said cylinder in communication with said hollow space, whereby gas admitted into said chamber is distributed upwardly through said perforate upper surface of said pebble mass support member; vertical passageways through said pebble mass support member for conducting pebble flow therethrough; said bottom closure member terminating in a pebble outlet conduit for conducting an exit flow of pebbles from said cylinder; a plurality of vertically extending pebble inlet conduits disposed on an outer periphery of the top closure member of said cylinder, whereby pebbles admitted into said chamber pass downwardly and inwardly therein to form a pebble mass having an indented upper surface corresponding in contour to the upper perforate surface of said pebble mass support member; and an effluent gas outlet conduit disposed axially in said top closure member.

5. The apparatus of claim 3 wherein an ejector means comprising a Venturi tube axially connected with a water fog nozzle is connected with said gas outlet conduit so as to provide for quenching effluent gas in direct heat exchange with water.

6. The apparatus of claim 4 wherein an ejector means comprising a Venturi tube axially connected with a water fog nozzle is connected with said gas outlet conduit so as to provide for quenching effluent gas from said reaction chamber in heat exchange relation with water.

7. A pebble heat exchange chamber comprising in combination a closed upright shell; pebble inlet means in the upper end of said shell; pebble outlet means in the lower end of said shell; fluid inlet means in the lower portion of said shell; a first laterally positioned inner closure member in the upper portion of and spaced downwardly from the upper end of said chamber; a second laterally positioned inner closure member in the upper portion of said chamber and spaced downwardly from said first inner closure member; gaseous effluent conduit means in said second inner closure member extending from the chamber portion below said second inner closure to the exterior of said shell; and pebble conduit means consisting of at least one pebble conduit disposed at and about the periphery of said inner closures, extending from the chamber portion above said first inner closure to the chamber portion below said second inner closure.

8. A pebble heat exchange chamber comprising in combination a closed upright shell; pebble inlet means in the upper end of said shell; pebble outlet means in the lower end of said shell; fluid inlet means in the lower portion of said shell; a first laterally positioned inner closure member in the upper portion of said chamber, spaced downwardly from said pebble inlet means and extending downwardly and outwardly to the wall of said chamber; a second laterally positioned inner closure member spaced downwardly from said first inner closure member; gaseous effluent conduit means in said second inner closure member extending from the chamber portion below said second inner closure to the exterior of said shell; and pebble conduit means consisting of at least one pebble conduit disposed at and about the periphery of said inner closure, extending from the chamber portion above said first closure to the chamber portion below said second inner closure.

9. A pebble heat exchange chamber comprising in combination a closed upright shell; pebble inlet means in the upper end of said shell; pebble outlet means in the lower end of said shell; fluid inlet means in the lower portion of said shell; a first laterally positioned inner closure member in the upper portion of said chamber, spaced downwardly from said pebble inlet means and extending downwardly and outwardly to the wall of said chamber; a second laterally positioned inner closure member spaced downwardly from said first inner closure member and extending downwardly and outwardly to the wall of said chamber; gaseous effluent conduit means centrally positioned in said second inner closure member extending from the chamber portion below said second inner closure through the space formed between said inner closure to the exterior of said shell; and pebble conduit means consisting of at least one pebble conduit disposed at and about the periphery of said inner closure, extending from the chamber portion above said first inner closure to the chamber portion below said second inner closure.

10. The pebble heat exchange chamber of claim 9 wherein ejector means are provided within said gaseous effluent conduit means.

11. A process for effecting conversion of hydrocarbons in direct heat exchange with hot gravitating pebbles, which comprises introducing said hot pebbles peripherially at the upper end of a pebble reaction zone, whereby said pebbles form a gravitating mass having an inverted conically indented upper surface; maintaining a contiguous pebble mass which is of substantially equal vertical thickness across its entire cross section; introducing hydrocarbon reactant materials into the lower end of said gravitating pebble mass within said reaction zone at a plurality of points uniformly distributed across said bed; passing said reactant materials upwardly through said gravitating pebble mass over paths of substantially uniform length; ejecting gaseous effluent from the upper central portion of said reaction zone; and removing said pebbles from the lower end of said reaction zone at uniformly spaced points substantially vertically equi-distant from the top of said pebble mass.

12. The process of claim 11 wherein the flow of gaseous effluent from said reaction zone is aspirated by passing finely divided water through an aspiration zone together with said gaseous effluent from said reaction zone.

SAM P. ROBINSON.

REFERENCES CITED

The following references are of record in the file of this patent:

UNITED STATES PATENTS

| Number | Name | Date |
| --- | --- | --- |
| 2,398,759 | Angell | Apr. 23, 1946 |
| 2,437,383 | Dalton | Mar. 9, 1948 |
| 2,448,922 | Simpson et al. | Sept. 7, 1948 |
| 2,548,912 | Savage | Apr. 17, 1951 |